(12) United States Patent
Avery, III

(10) Patent No.: US 9,688,396 B2
(45) Date of Patent: Jun. 27, 2017

(54) DUCTED OBLIQUE-ROTOR VTOL VEHICLE

(71) Applicant: John Leonard Avery, III, Colfax, NC (US)

(72) Inventor: John Leonard Avery, III, Colfax, NC (US)

(73) Assignee: AVERY AEROSPACE CORPORATION, Jupiter, FL (US)

( * ) Notice: Subject to any disclaimer, the term of this patent is extended or adjusted under 35 U.S.C. 154(b) by 140 days.

(21) Appl. No.: 14/742,878

(22) Filed: Jun. 18, 2015

(65) Prior Publication Data
US 2016/0368601 A1    Dec. 22, 2016

(51) Int. Cl.
*B64C 29/00* (2006.01)
*B64C 15/00* (2006.01)
*B64C 13/30* (2006.01)
*B64C 1/00* (2006.01)

(52) U.S. Cl.
CPC .......... *B64C 29/0025* (2013.01); *B64C 15/00* (2013.01); *B64C 1/0009* (2013.01); *B64C 13/30* (2013.01); *Y02T 50/12* (2013.01); *Y02T 50/44* (2013.01)

(58) Field of Classification Search
CPC ..... B64C 1/0009; B64C 11/001; B64C 29/00; B64C 29/0008; B64C 29/0016; B64C 29/0025; B64C 37/00
See application file for complete search history.

(56) References Cited

U.S. PATENT DOCUMENTS

| | | | |
|---|---|---|---|
| 1,822,386 A | 9/1931 | Andersen | |
| 2,461,435 A | 2/1949 | Neumann | |
| 2,567,392 A | 9/1951 | Naught | |
| 2,777,649 A | 1/1957 | Williams | |
| 2,828,929 A | 4/1958 | Lippisch | |
| 2,880,945 A | 4/1959 | Crane | |
| 2,955,780 A | 10/1960 | Hubert | |
| 2,968,453 A | 1/1961 | Bright | |
| 3,026,066 A * | 3/1962 | Coates | B60K 3/04 244/12.1 |
| 3,135,480 A * | 6/1964 | Chaplin, Jr. | B60V 1/08 180/116 |

(Continued)

*Primary Examiner* — Nicholas McFall

(57) ABSTRACT

The present invention is a winged VTOL aircraft of novel configuration that utilizes a single-axis rotor mounted at an oblique angle within a forward-facing, bifurcating duct, that is controlled by a plurality of servo driven vanes, producing a mechanically simple, redundantly controlled vehicle that can carry cargo, people, or otherwise, directly from point to point. The configuration uses sets of vanes to produce both moments and forces referenced around the vehicle's center of gravity, thereby, allowing the vehicle to translate in a level position, or stay stationary relative to the ground while at a slight pitch or roll attitude. This feature is very important for autonomous vehicles to accurately pick up and drop off payloads on unlevel terrain or in windy conditions. Other rotor vehicles require pitch or roll attitude to translate or compensate for wind. Complementing this vehicle's mechanically simple rotor system is a novel mechanism that collectively drives the pitch of the rotor blades by combining the input from three separate servos. Each servo can be controlled by redundant fight control systems.

2 Claims, 10 Drawing Sheets

(56) References Cited

U.S. PATENT DOCUMENTS

| | | | |
|---|---|---|---|
| 3,184,183 A | | 5/1965 | Piasecki |
| 3,397,852 A | | 8/1968 | Katzen |
| 3,454,238 A | * | 7/1969 | Goodson ............ B64C 29/0025 |
| | | | 244/12.3 |
| 4,022,405 A | | 5/1977 | Peterson |
| 4,795,111 A | | 1/1989 | Moller |
| 4,796,836 A | | 1/1989 | Buchelt |
| 5,064,143 A | | 11/1991 | Bucher |
| 5,115,996 A | | 5/1992 | Moller |
| 5,295,643 A | | 3/1994 | Ebbert |
| 5,419,514 A | | 5/1995 | Ducan |
| 5,454,531 A | * | 10/1995 | Melkuti ............ B64C 29/0025 |
| | | | 244/12.6 |
| 6,450,445 B1 | | 9/2002 | Moller |
| 6,464,166 B1 | | 10/2002 | Yoeli |
| 6,883,748 B2 | | 4/2005 | Yoeli |
| 6,892,979 B2 | | 5/2005 | Milde |
| 7,032,861 B2 | | 4/2006 | Sanders |
| 7,246,769 B2 | | 7/2007 | Yoeli |
| 7,249,732 B2 | | 7/2007 | Sanders |
| 7,857,253 B2 | | 12/2010 | Yoeli |
| 8,651,432 B2 | | 2/2014 | De Roche |
| 8,733,690 B2 | | 5/2014 | Bevirt |
| 8,931,729 B2 | | 1/2015 | Abde Qader Alzu-Bi |
| 2009/0084907 A1 | | 4/2009 | Yoeli |
| 2009/0224095 A1 | | 9/2009 | Cox |
| 2010/0270419 A1 | | 10/2010 | Yoeli |
| 2011/0042509 A1 | | 2/2011 | Bevirt |
| 2011/0042510 A1 | | 2/2011 | Bevirt |
| 2011/0049306 A1 | | 3/2011 | Yoeli |
| 2011/0155859 A1 | | 6/2011 | Vetters |
| 2011/0168834 A1 | | 7/2011 | Yoeli |
| 2013/0105635 A1 | | 5/2013 | Alzu'bi |

* cited by examiner

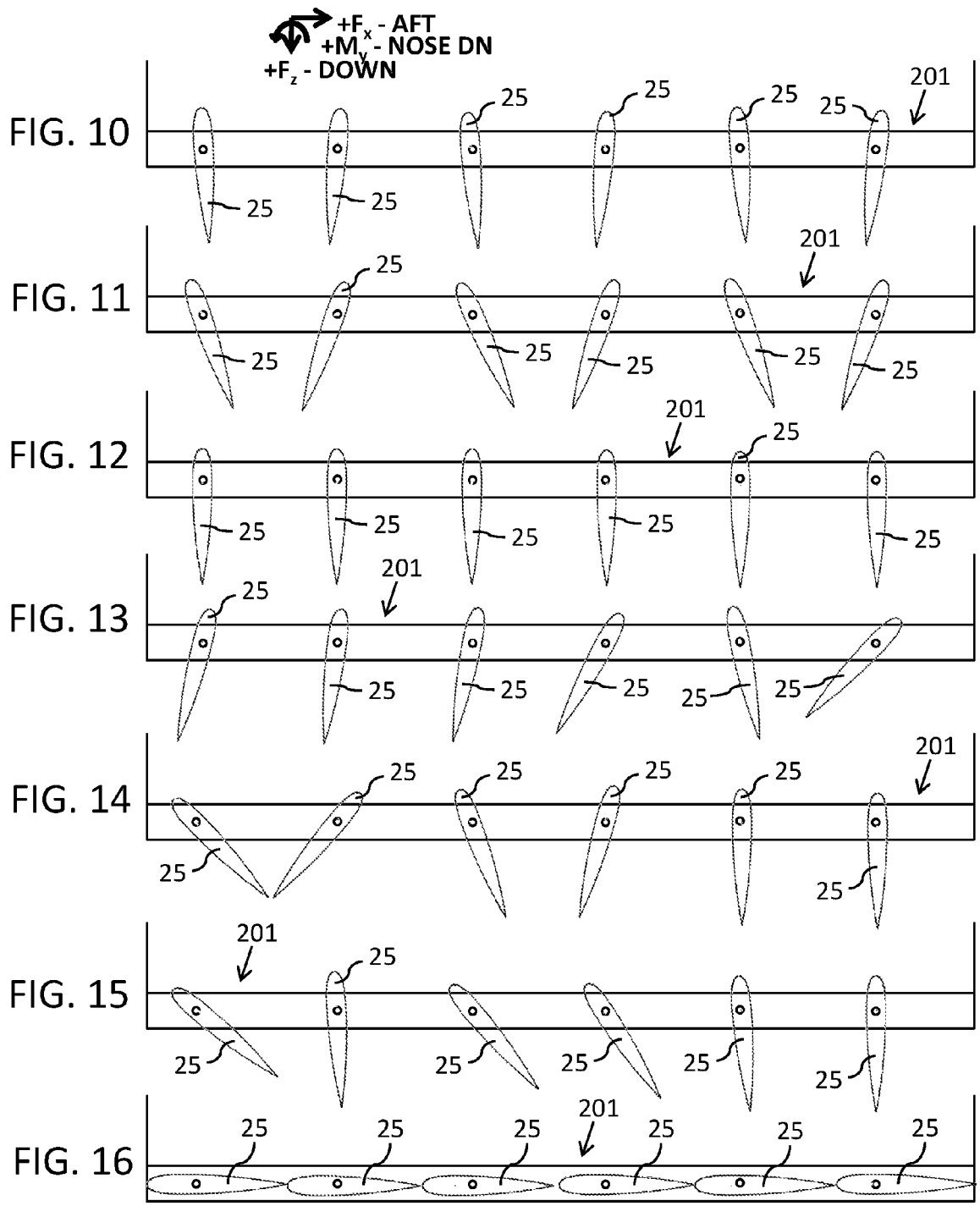

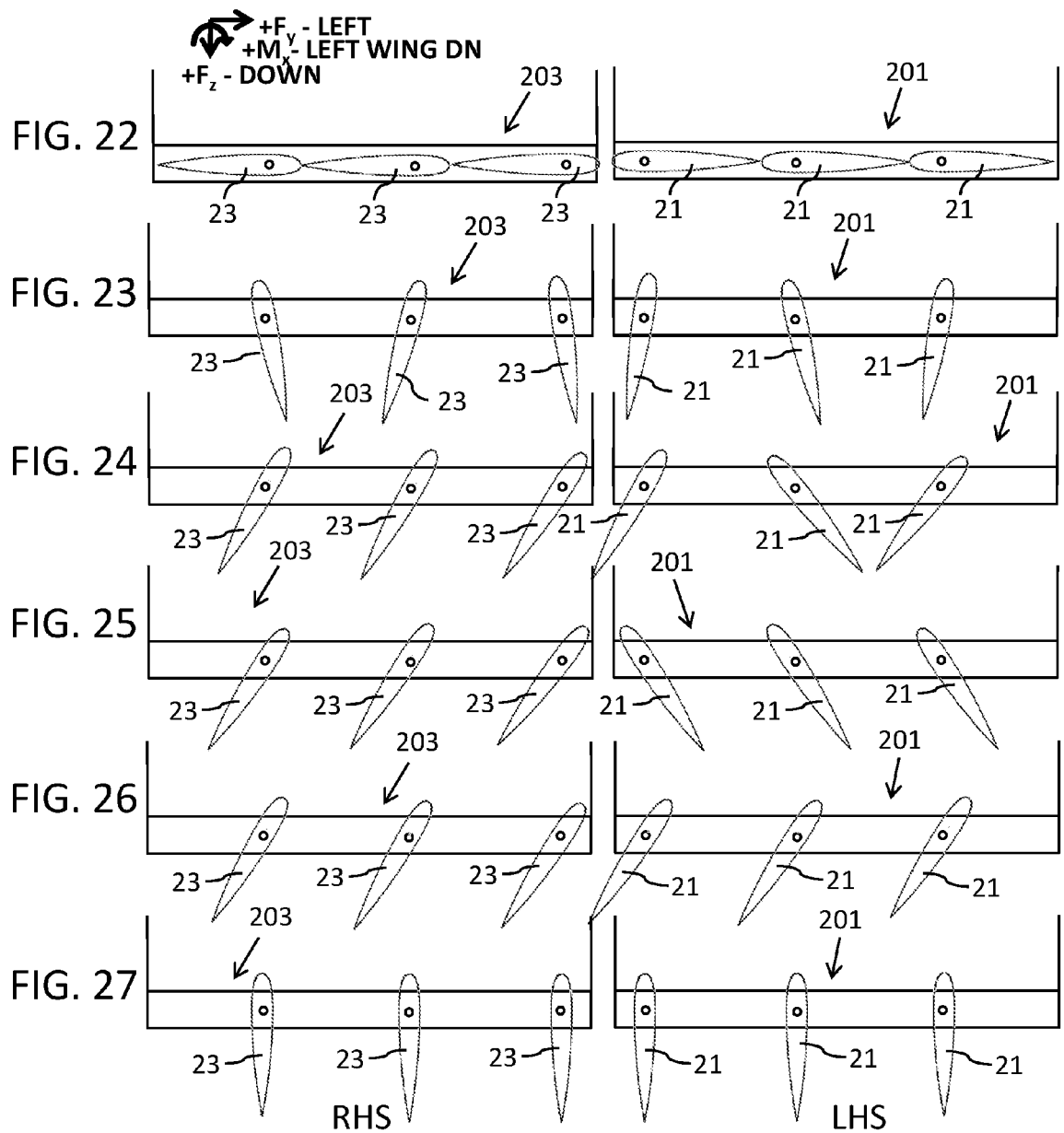

DUCTED OBLIQUE-ROTOR VTOL VEHICLE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

The present invention relates generally to a vertical take-off and landing (VTOL) winged vehicle and, more particularly, to a ducted, single-axis, oblique-rotor, flying vehicle that is controlled predominately by vanes in vertical flight mode and a combination of vanes and aerodynamic surfaces when in horizontal, or a wing-lifting, flight mode.

Prior Art

Flying machines that can takeoff vertically and hover have been around for over a century. To date, the most practical configuration of these machines is the helicopter. Although there have been variations of the helicopter design, all have similar mechanisms. The reasons for the success of the helicopter is the light-weight structural configuration of the rotor system that allows for a low disc loading and the ability to auto-rotate in the event of engine failure.

The helicopter has several limitations, however, including speed and range, because of the rotor's direct exposure to the freestream airflow. Another limitation of the helicopter is the inherent danger of exposed main and tail rotor blades to ground personnel. Finally, noise and airframe vibration is synonymous with the helicopter.

Humans have trying to solve these problems and create a more esthetically pleasing form of the helicopter ever since its creation. An early design conceptualized a propeller housed in a shroud and used a minimum number of vanes for control. See U.S. Pat. No. 1,822,386 (Andersen). Other early designs tried to encapsulate a large rotor with vanes, above and below, to direct flow and provide control. See U.S. Pat. No. 2,777,649 (Williams). Later, single and multi-rotor platforms were studied. See U.S. Pat. No. 2,955,780 (Hulbert). Winged, tandem-rotor platforms were also proposed. See U.S. Pat. No. 2,968,453 (Bright). Piasecki Aircraft Corporation built several prototypes of the wingless, tandem-rotor platforms. They were controlled by using both vanes and differentially adjusting the collective pitch control between each rotor. See U.S. Pat. No. 3,184,183 (Piasecki). More recent designs of the VTOL aircraft have been around for decades without becoming practical. An example of this is the Moller Skycar. The design requires very high power to weight ratios and complex mechanical control systems. See U.S. Pat. No. 5,115,996 (Moller).

Work has continued on the tandem rotor platform vehicle in recent times. These configurations are proposed with wings and without, with gamboling rotors and a multitude of vane configurations. See U.S. Pat. No. 6,464,166 (Yoeli), U.S. Pat. No. 6,883,748 (Yoeli), U.S. Pat. No. 6,892,979 (Milde), U.S. Pat. No. 7,246,769 (Yoeli), U.S. Pat. No. 7,249,732 (Sanders), 2009/0084907 (Yoeli), 2010/0270419 (Yoeli), U.S. Pat. No. 7,857,253 (Yoeli), 2011/0049306 (Yoeli), 2011/0168834 (Yoeli), U.S. Pat. No. 8,651,432 (De Roche). These concepts may have merit for short range and endurance, however, the design is inherently inefficient for both lifting capacity and horizontal flight.

Another concept that has recently been proposed, because of advances in electric power storage and reduction in motor weight, is the use of multiple, small, electricly-powered rotors, either shrouded or un-shrouded, to provide lift and control. See US. Pat. Appl. No. 2011/0042509 (Bevirt). Their design proposes that multiple rotors be used to provide differential thrust to control the vehicle. There are at least two drawbacks to these designs. Firstly, the inherent propulsion efficiency of multiple, small fans, shrouds, and electric motors will be limited. Secondly, the whole vehicle must be rolled or pitched away from level in order to translate or compensate for wind near the ground. This coupling of orientation and translation has drawbacks if the vehicle is to be used for the transportation of packages to and from the ground.

Objects and Advantages

Point-to-point transportation of products and people have been dreamt about for centuries. The idea of stepping into a personal flying machine that can take someone directly to where they want to go, all while watching the world from above, is alluring. Recently, corporations have even set goals to autonomously deliver packages to individual residence from the air. The present state of the art in air vehicles has prohibited either of these visions from realization. There is currently inadequate infrastructure to safely direct the number of flying machines required for mass movements of everyday people and goods. There is also a lack of viable aircraft that can safely be flown from or into residential or commercial locations, much less, ones that can be done at a price people can afford. A flying machine that will someday make point-to-point transportation a reality will be controlled autonomously. These machines must be able to land in a multitude of locations across a densely populated area since current airports do not have the areal capacity to park all the vehicles of those visiting and inhabiting a city. Flight paths of vehicles will be in close proximity and precise navigation and control will be required to safely integrate into the congested airspace in both visual and instrument meteorological conditions.

Flying machines that takeoff and land vertically have evolved into two districted groups, those with relatively small, enclosed rotors or lift nozzles, such as the Joint Strike Fighter or Harrier, and those with large rotors, such as helicopters. The first group has very high disk loading or nozzle pressures and requires large power-to-weight ratios to achieve vertical flight. They need state-of-the-art, expensive, fuel inefficient engines that produce noise levels much beyond what are acceptable in residential or business communities. The second group of vehicles, the helicopter, can fly vertically on much lower-power and use relatively efficient engines; however, they require trained personnel to be in their vicinity because of the dangers from exposed rotors. Helicopters also have inherent limited range and speed capability. Hybrid vehicles, such as the Osprey or Eagle Eye, using tilt-rotor configurations, have been introduced and used in service but this configuration requires very expensive turbine engines and complex mechanical systems for them to fly safely. And, they still suffer from the dangers of exposed rotors.

Electric, multi-rotor, flying vehicles have recently been introduced to the public for entertainment or used as a photography platform. These machines have only become available because of the miniaturization of electronic components and improved battery technology. They can be made with propulsion redundancy if enough rotors are employed; however, this adds complexity and weight. This configuration still suffers from exposed rotors which can be dangerous if scaled to a size that is useful to carry cargo or people.

Accordingly, there are several objects and advantages of my invention. The vehicle's novel oblique rotor configuration with forward facing inlet is the simplest mechanical system that can provide efficient vertical lift and horizontal propulsion. Multiple rotors rarely provide additional redundancy since failure of any mechanical component in a rotor system general means loss of the vehicle. The bifurcating duct that integrates the invention's payload location and also separates the left and right vertical control vanes, provides an optimum configuration for tomorrow's transportation needs. This simple mechanical rotor system using a plurality of vanes in a redundant configuration produces a reliable vehicle using inexpensive servos for control. This configuration also allows the vehicle to decouple attitude and translational flight control so that it can translate in a level position or stay stationary in a slight unlevel attitude. This feature is needed for package pickup and delivery and provides advantages for weapons delivery. Another advantage of this configuration is that it has a medium disc loading which can be powered by a hybrid electric-internal combustion powerplant and will produce little noise compared to current turbine-powered machines. Also, the rotor is completely enclosed, disallowing inadvertent contact with people or property. This configuration, integrated with wings, allows this vehicle to have much greater range and endurance than either a helicopter or any other enclosed-rotor VTOL configuration. The novel rotor pitch control mechanism in this invention allows for this simple rotor configuration while maintaining triple redundant collective control. Also, the geometric configuration of the vane installation decouples the vane control servo from the vane while the vane is in the stowed position and still being loaded by aerodynamic forces.

SUMMARY OF INVENTION

The present invention is a winged VTOL aircraft of novel configuration that utilizes a single-axis rotor mounted at an oblique angle within a forward-facing, bifurcating duct, that is controlled by a plurality of servo driven vanes, producing a mechanically simple, redundantly controlled vehicle that can carry cargo, people, or otherwise, directly from point to point. The configuration uses sets of vanes to produce both moments and forces referenced around the vehicle's center of gravity, thereby, allowing the vehicle to translate in a level position, or stay stationary relative to the ground while at a slight pitch or roll attitude. This feature is very important for autonomous vehicles to accurately pick up and drop off payloads on unlevel terrain or in windy conditions. Other rotor vehicles require pitch or roll attitude to translate or compensate for wind. Complementing this vehicle's mechanically simple rotor system is a novel mechanism that collectively drives the pitch of the rotor blades by combining the input from three separate servos. Each servo can be controlled by redundant fight control systems.

The use of the multi-vane configuration in the present invention lends itself to control redundancy using a mechanically simple, single-axis rotor that other configurations don't have. This allows for the use of less reliable, commercial servos and actuators, thereby, improving safety at a lower cost. Using a triple-redundancy in the rotor pitch control system and using multiple parallel powerplants, the present invention could revolutionize package delivery and personal transportation. This configuration could also have large implications in military intelligence gathering and weapons delivery.

The vehicle described here has a ducted inlet that faces approximately forward. Two sets of vanes are employed to control the vehicle, one set for vertical and transition to horizontal flight, housed in the lower exit duct on the bottom of the vehicle, and the other, for horizontal flight, is located on the exit duct at the aft section of the vehicle. During the horizontal flight mode, the bottom exit nozzle is completely closed off by the vanes that have rotated to a position in-plane with the bottom of the vehicle. Conversely, when the vehicle is in vertical flight, and not in transition, the aft vanes are closed completely, sealing off the aft exit nozzle. The set of lower vanes for horizontal flight is broken up into longitudinal and lateral vanes. The longitudinal vanes control the vehicle's attitude in pitch, roll, yaw, and fine altitude adjustments as well as for-aft translation. The lateral vanes control pitch attitude, roll and yaw as well as lateral translation without needing to roll the vehicle away from level. When the vehicle is in transition to and in horizontal flight mode, roll is controlled by wing-mounted ailerons and yaw by rudders mounted on the vertical stabilizer. The preferred embodiment does not employ a horizontal stabilizer or external elevator for stability or control, however the present invention will work for any lifting surface configuration, including but not limited to, a conventional wing and aft tail, a canard and rear mounted wing, tandem wings, or a tri-surface configuration. The present invention can be powered by an internal combustion (IC) engine, turbine or otherwise, or plurality of engines, or use electric motors or other means to power the rotor. Multiple rotors could also be used along a single axis, although this complicates the configuration. A hybrid, internal combustion-electric powered vehicle using two independent electric power systems and one internal combustion engine is the preferred configuration, each with approximately the same power output capacity. The electric motors and the IC engine are used for takeoff and transition to the horizontal flight mode. The batteries are then charged using the electric motors as alternators. Landing is accomplished using all three systems. The aircraft is designed to require only the power from two of the three systems to maintain altitude during the vertical flight mode. Also, a differing quantity of electric motors could be used to drive the rotor system. Purely electric propulsion is also possible; however, it will suffer from a short range and endurance at the present time.

Rotor pitch control is achieved on the preferred configuration using three separate irreversible servos that are connected to a common plane that pivots about and translates along the rotor axis (FIG. 28). The actual pitch input is that of the relative translation of a point created by the intersection of the servo attachments and the rotor spin axis. Each blade's pitch is adjusted in unison in proportion to a kind of averaging of the three input servos. This configuration allows for one or two control systems or actuator failures while still maintaining pitch controllability. Another possibility is to independently control pairs of blades through multiple concentric collective linkages. And still a final configuration is to use a fixed-pitch rotor.

These and other features and advantages of the present invention will be readily apparent to those of skill in the art from a review of the following detailed description along with the accompanying drawing figures.

BRIEF DESCRIPTION OF THE DRAWINGS

FIG. 10 is a sectional view of the left-hand-side longitudinal control vanes—neutral lift positions.

FIG. 11 is a sectional view of the left-hand-side longitudinal control vanes—reduced lift positions.

FIG. 12 is a sectional view of the left-hand-side longitudinal control vanes—increased lift positions.

FIG. 13 is a sectional view of the left-hand-side longitudinal control vanes—aft force ($+F_x$) positions.

FIG. 14 is a sectional view of the left-hand-side longitudinal control vanes—nose-down pitching moment ($+M_y$) positions.

FIG. 15 is a sectional view of the left-hand-side longitudinal control vanes—forward force ($-F_x$) positions.

FIG. 16 is a sectional view of the left-hand-side longitudinal control vanes—no force or moment, stowed for horizontal flight mode.

FIG. 22 is a sectional view of the lateral control vanes—stowed positions for horizontal flight mode.

FIG. 23 is a sectional view of the lateral control vanes—neutral lift position.

FIG. 24 is a sectional view of the lateral control vanes—lateral force ($+F_y$) positions.

FIG. 25 is a sectional view of the lateral control vanes—reduced lift and pitch up positions.

FIG. 26 is a sectional view of the lateral control vanes—lateral force ($+F_y$) and roll force ($-M_x$) positions.

FIG. 27 is a sectional view of the lateral control vanes—increase lift force ($-F_z$) positions.

DETAILED DESCRIPTION OF THE PREFERRED EMBODIMENTS

Figure 1:
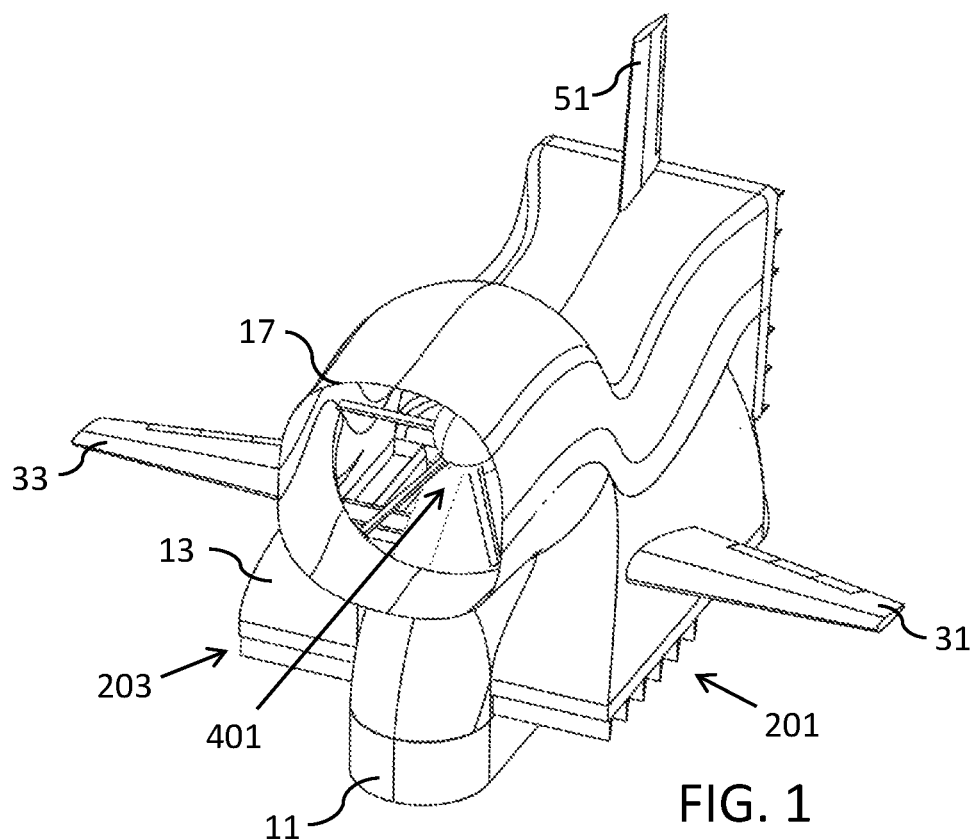
FIG. 1 is a perspective view of the present invention showing the duct intake, rotor, wings, and cargo container.
Figure 2:
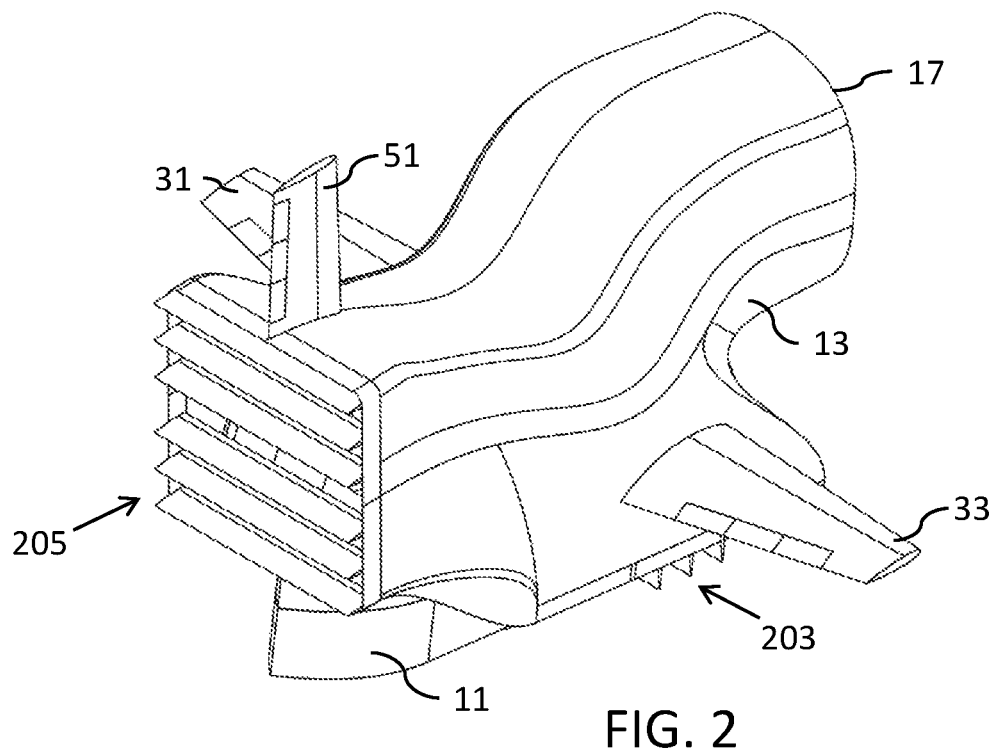
FIG. 2 is a perspective view of the present invention showing the aft duct exit vanes, vertical stabilizer, wings and cargo container.
Figure 3:
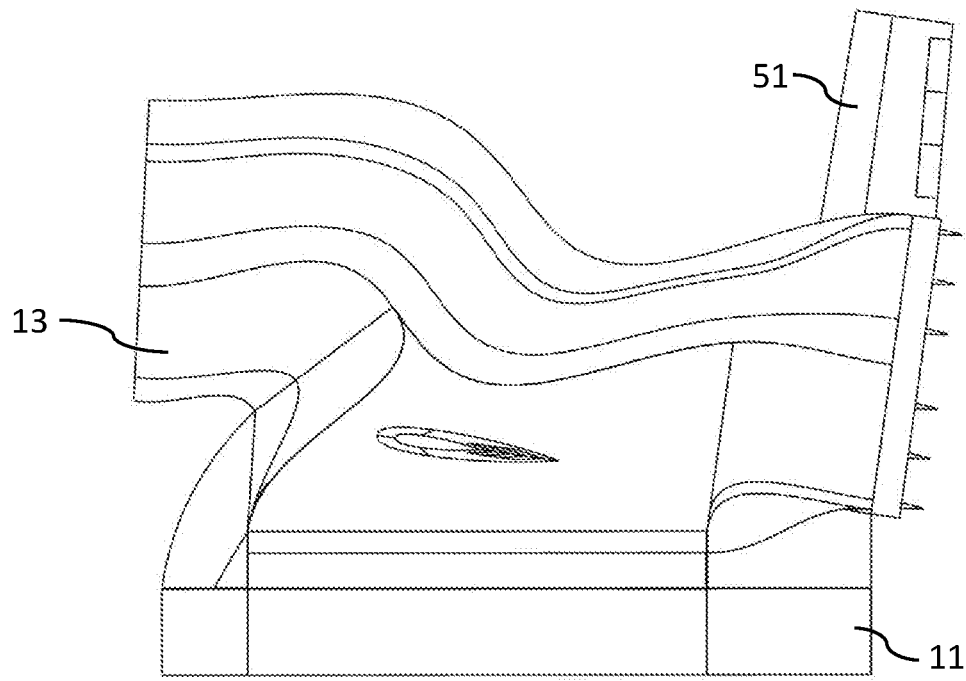
FIG. 3 is a side view of the present invention.
Figure 4:
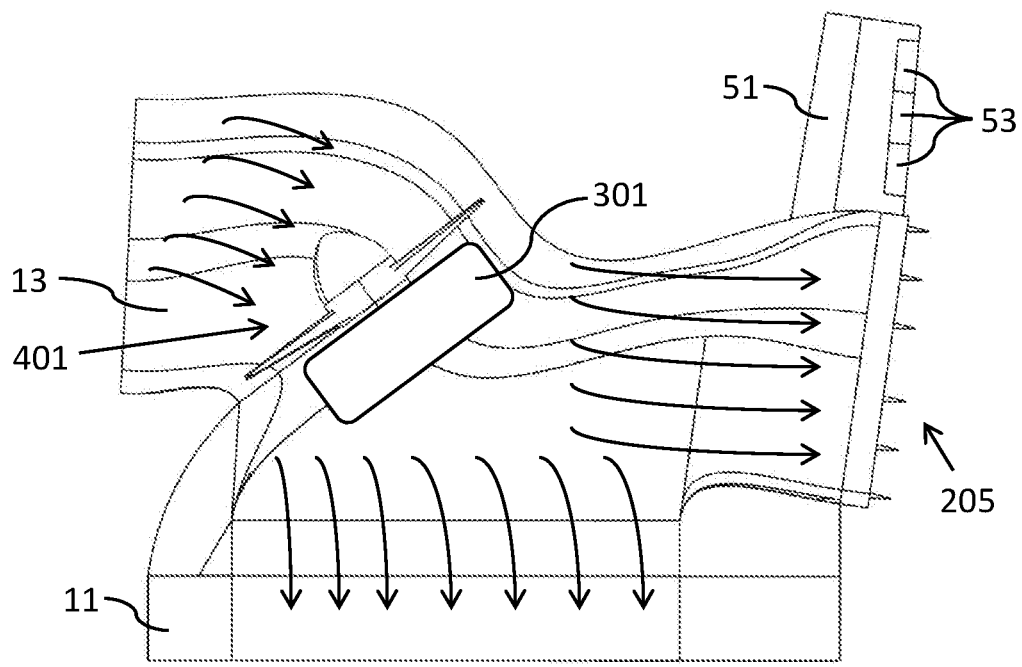
FIG. 4 is a sectional view of the present invention illustrating air flow, the rotor and powerplant placement, and lower and aft duct exits.
Figure 5:
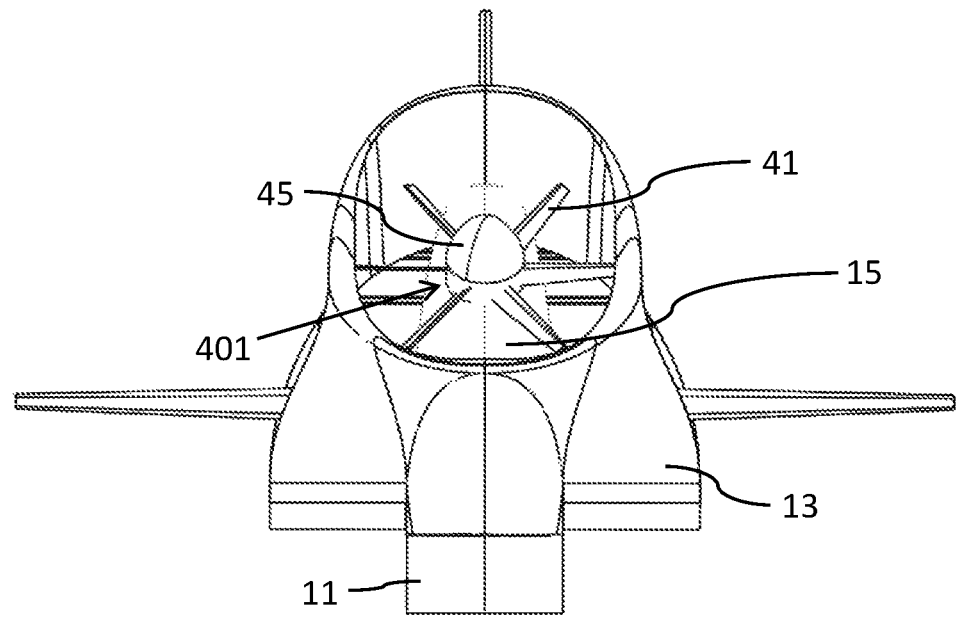
FIG. 5 is a front view of the present invention.
Figure 6:
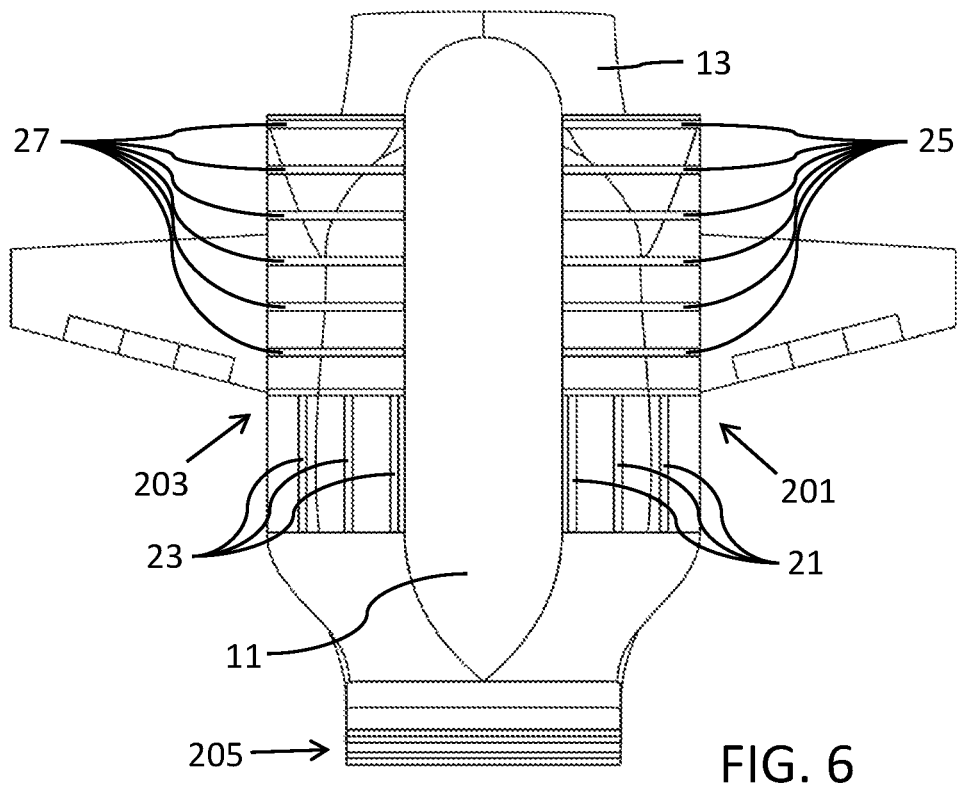
FIG. 6 is a plan view from the bottom of the present invention showing longitudinal and lateral vane placements and location of the cargo container.
Figure 7:
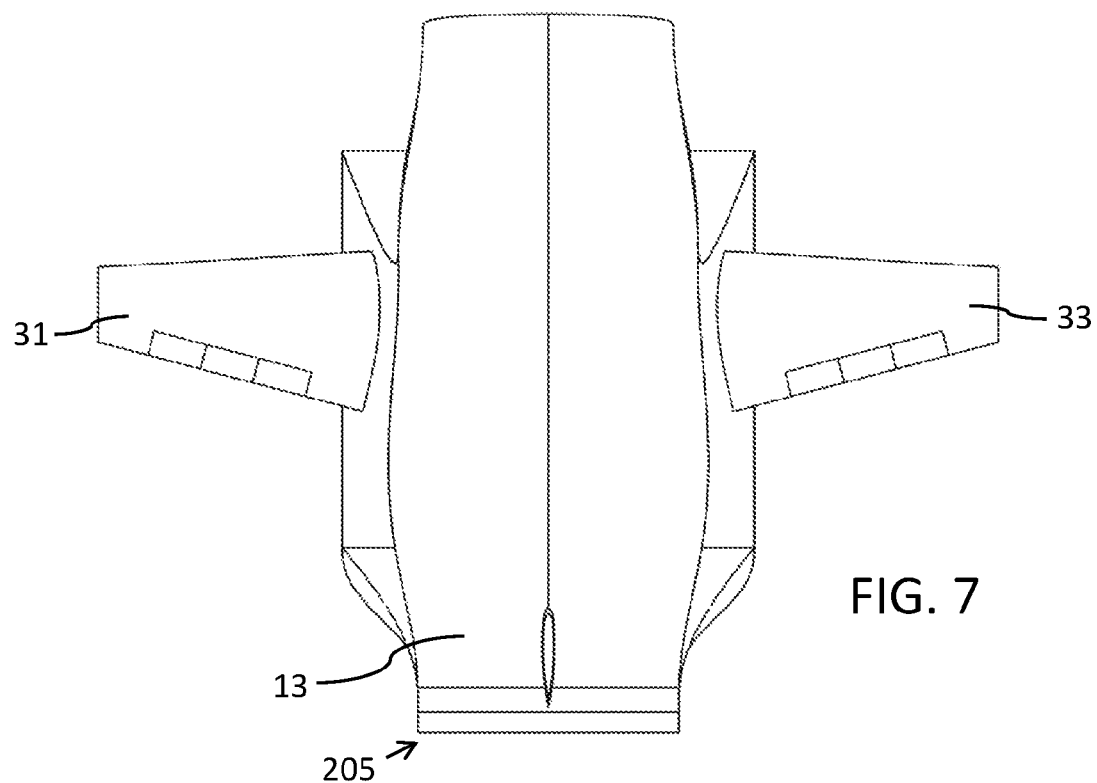
FIG. 7 is a plan view from the above of the present invention.
Figure 8:
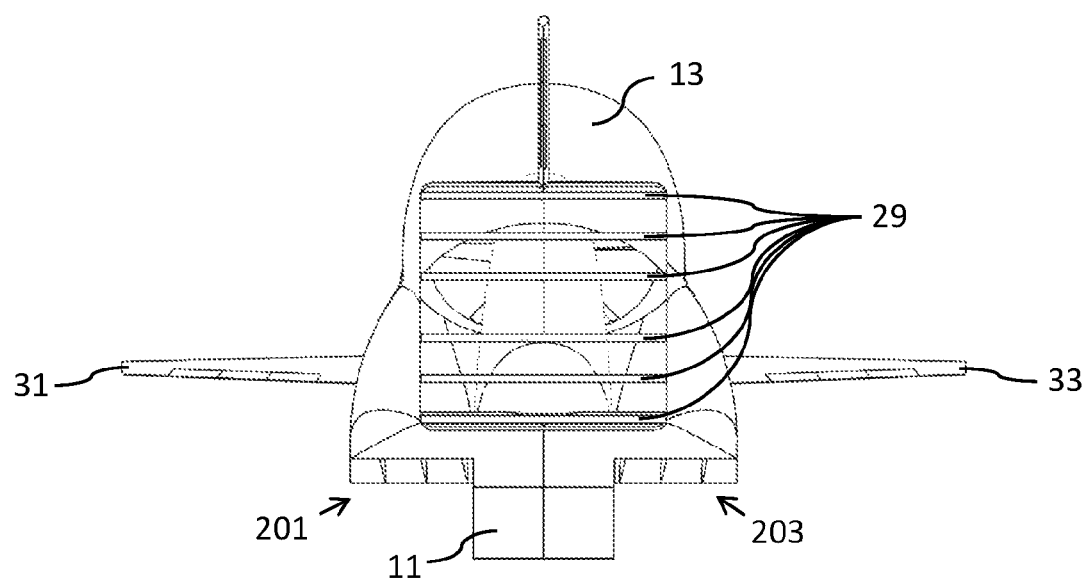
FIG. 8 is an aft view of the present invention illustrating the aft duct exit and vane placements.
Figure 9:
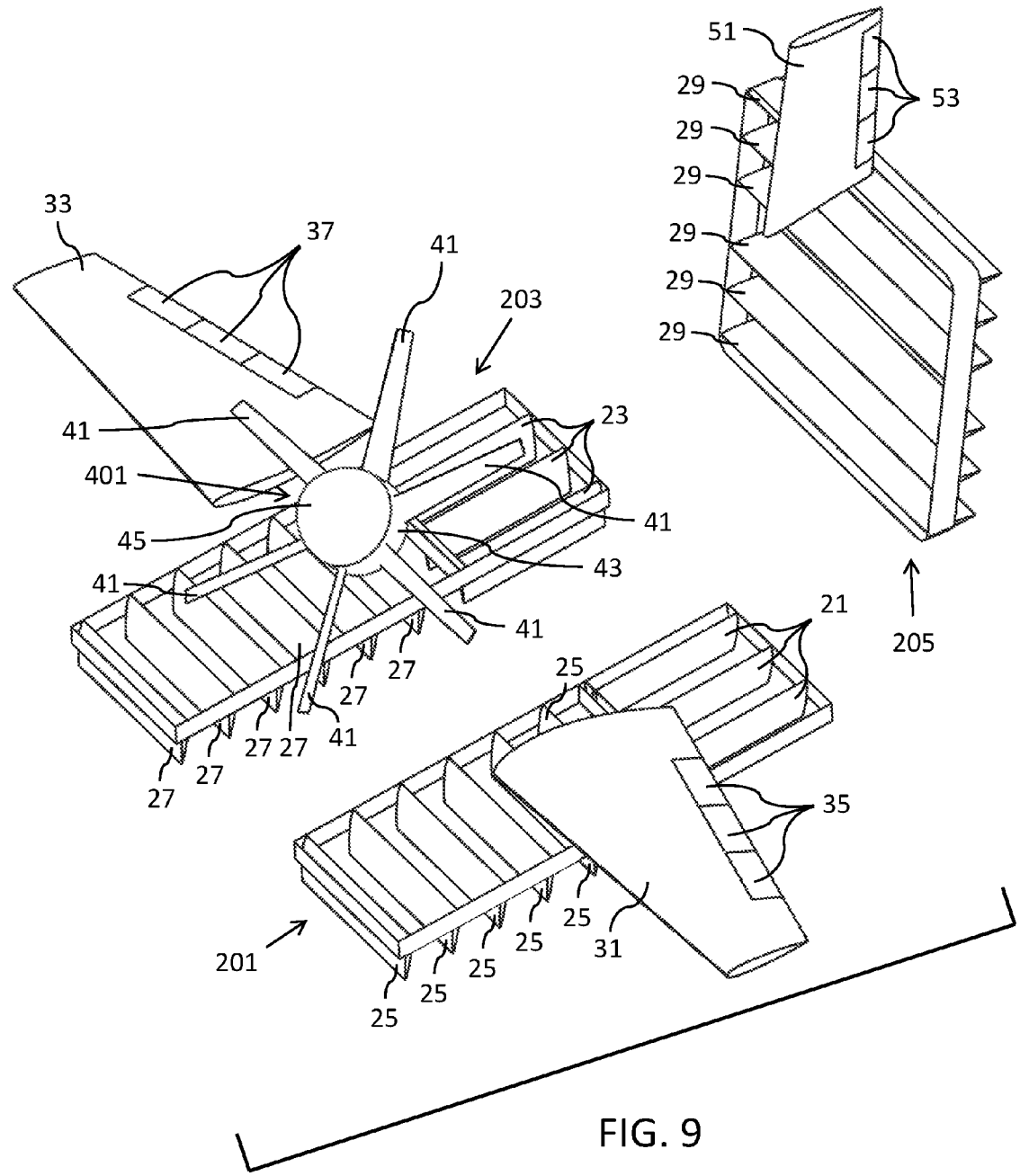
FIG. 9 is a perspective view of the control vanes, aerodynamic surface and rotor.

The preferred embodiment of the present invention is a ducted, single-rotor, vane-controlled, vertical takeoff and landing, autonomously controlled, hybrid-electric, winged, vehicle with triple-redundant propulsion and control systems. The plane of the rotor is fixed relative to the vehicle in a position inclined approximately halfway between the vehicle's longitudinal and vertical axis. The vehicle has two predominant flight modes, vertical and horizontal. It carries a cargo pod 11, passenger compartment or otherwise between each vertical duct exit.

During vertical flight, lift is create by ingesting air into the inlet 17, accelerating it across the rotor 401, separating it at the bifurcation duct 15 and directing it downward through left-hand 201 and right-hand 203 vertical duct exits. Control in the vertical flight mode is achieved by using the vertical exit vanes to create forces and moments in all six degrees of freedom about the vehicle's center of gravity. The vanes are moved by servos that are directed by a plurality of flight computers or controllers. The vertical exit vanes are further broken down into longitudinal and lateral sets consisting of the left-hand longitudinal vanes 25, left-hand lateral vanes 21, the right-hand longitudinal vanes 27, and the right-hand lateral vanes 23. Longitudinal vanes are used to create longitudinal force, instantaneous lift change and moments to adjust the pitch, roll and yaw attitudes. Lateral vanes are used to create lateral force, instantaneous lift change and moments to adjust pitch, roll and yaw attitudes. Longitudinal and lateral forces are created on the vehicle by directing the flow of air away from vertically downward using a majority of the vanes. Since the center of gravity of the vehicle is above the plane of the vertical duct exit, moments will accompany any longitudinal or lateral force input unless local changes in lift occur simultaneously. Pitch, roll and yaw attitude is maintained or changed by balancing or modifying net moments that are created by all longitudinal and lateral vane forces and changes in local pressure distributions internal and external to the vehicle caused by deflecting said vanes in similar or opposing directions, in pairs or more. Vanes may move from partially deflected positions (FIGS. 10 and 23) to those more aligned to the ducted airflow (FIGS. 12 and 27), creating a local increase in lift.

Some possible longitudinal vane 25 positions of the left-hand vertical duct exit 201 are shown in FIGS. 10 through 16. FIGS. 10 and 12 depict the vanes in neutral and net increased lift ($-F_z$) positions, respectively. FIG. 11 shows vane positions that produce balanced longitudinal forces while still decreasing local lift ($+F_z$), creating a left roll moment ($+M_x$) about the vehicle's center of gravity. To produce an aft force ($+F_x$), and lift distribution to offset a pitching moment, vanes can be positioned similarly to those shown in FIG. 13. FIG. 14 shows vane positions that will produce a pitching moment about the vehicle's center of gravity without any net longitudinal force. To produce a forward force and translation of the vehicle with no pitch change, the vanes could be positioned as shown in FIG. 15. This would initiate forward velocity and a translation to horizontal flight. FIG. 16 shows the vanes 25 in the left-hand lower exit duct fully close as they would be in the horizontal flight mode.

Lateral forces are generated by moving the left-hand lateral vanes 21 and right-hand lateral vanes 23 located in the left-hand vertical duct exit 201 and right-hand vertical duct exit 203, respectively. Since the lateral vanes are located aft of the vehicle's center of gravity in the preferred embodiment, pitch attitude can be controlled by decreasing or increasing local lift forces through the deflection of vanes in opposite directions in pairs or more. FIG. 25 shows the defection of vanes to produce a decrease in local lift. This decrease would cause a nose-up pitching moment ($-M_y$) if other vanes on the vehicle were not adjusted. Alternatively, vane positions shown in FIG. 27 would cause a nose-down pitching moment ($+M_y$) if the lateral vanes were to move independently from all others. FIG. 23 shows lateral vane neutral positions, being able to be straightened for increase lift or opposed in pairs or more to decrease local lift. FIG. 24 will produce a net force to the vehicle's left-hand side ($+F_y$) while modifying the local lift distribution to balance any roll moments caused from the lateral load. Positioning vanes like those in FIG. 26 will produce a large lateral force ($+F_y$) and an associated rolling moment ($-M_x$). When the vehicle is in purely horizontal flight mode the vanes are rotated to completely block the airflow (FIG. 22), redirecting air to the aft duct exit 205.

Figures 17, 18, 19, 20, 21:
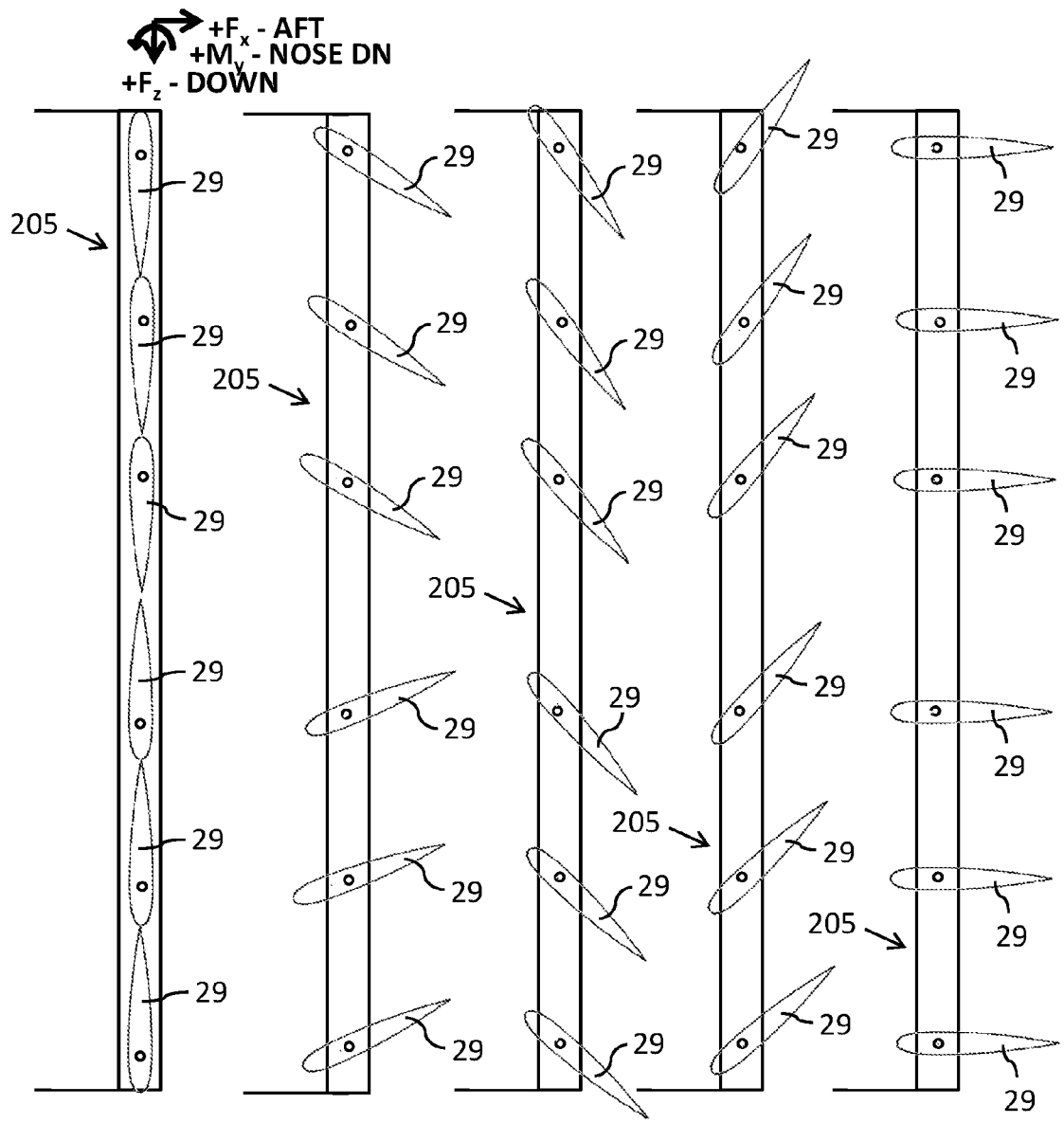
FIG. 17 is a sectional view of the horizontal control vanes—no force or moment, stowed for vertical flight mode.
FIG. 18 is a sectional view of the horizontal control vanes—partially open positions.
FIG. 19 is a sectional view of the horizontal control vanes—nose-down pitching moment ($+M_y$) positions.
FIG. 20 is a sectional view of the horizontal control vanes—nose-up pitching moment ($-M_y$) positions.
FIG. 21 is a sectional view of the horizontal control vanes—fully open positions.

To control the vehicle's pitch attitude in the horizontal flight mode, movable aft exit vanes 29 are deflected at the aft duct exit 205. FIGS. 17 through 21 depicted the vanes in possible positions from stowed (FIG. 17) to trimmed horizontal flight (FIG. 21). FIG. 18 depicts the vane position in transition from vertical to horizontal or horizontal to vertical flight. FIGS. 19 and 20 show aft exit vane 29 positions producing pitch down ($+M_y$) and pitch up ($-M_y$) moments, respectively. Roll attitude is controlled by the three redundant left-hand ailerons 35 and three redundant right-hand ailerons 37, mounted to the left wing 31 and right wing 33, respectively. Yaw control is maintained by the three redundant rudders 53 mounted on the vertical stabilizer 51.

Control of the vehicle in transition from vertical to horizontal, and horizontal to vertical flight is maintained by moving all the vanes and aerodynamic surfaces, together, in a similar manner as described above.

Figures and descriptions for producing forces and moments on the vehicle described here are considered building blocks and used to illustrate the method of control. Actual vane positioning may differ from those described here and will require other combinations that produce the forces and moments required to maintain vehicle control. This method of controlling the vehicle has many combinations of vane positions that will produce the same sets of net forces and moments, albeit, some more efficient than others. The control method described here, therefore, has redundant means of vehicle control in the event one or more vanes stop functioning properly, through the failure of a servo or complete control system. By dividing the vanes into dispersed groups and controlling each group of vanes using a separate control system, complete failure of one control system would not mean complete loss of control of the vehicle.

Addition embodiments of the vehicle are similar to what is described here but with the relocation of the lateral control vanes to near or forward of the vehicle's longitudinal center of gravity. Other possibilities include a differing number of vanes than are described here, but are still used in pairs or more to affect the lift distribution. An alternate embodiment may use vanes, movable or immovable, in addition to those at the vertical and aft duct exits to control airflow internal to the duct, in front of or aft of the rotor. An additional embodiment may have a different shape of the duct, duct exits, vanes or aerodynamic covers but that functions in a similar manor. The alternate embodiment may contain a duct inlet that changes sectional area as needed to improve propulsion efficiency or decrease aerodynamic drag. Still other embodiments may have different lifting surface configurations than described, including but not limited to, a conventional wing and aft tail, a canard and rear mounted wing, tandem wings, or a tri-surface configuration. A vertical stabilizer may also be in the form of vee-tail, multiple vertical stabilizers, inverted vee-tail, or otherwise, or be absent all together. Aerodynamic control surfaces described in present embodiment such as the ailerons and rudders may vary in quantity or may be in different form such as spoilers. Also, one or more elevators may be used, either fully moving or as part of stabilizer or canard.

Figure 29:
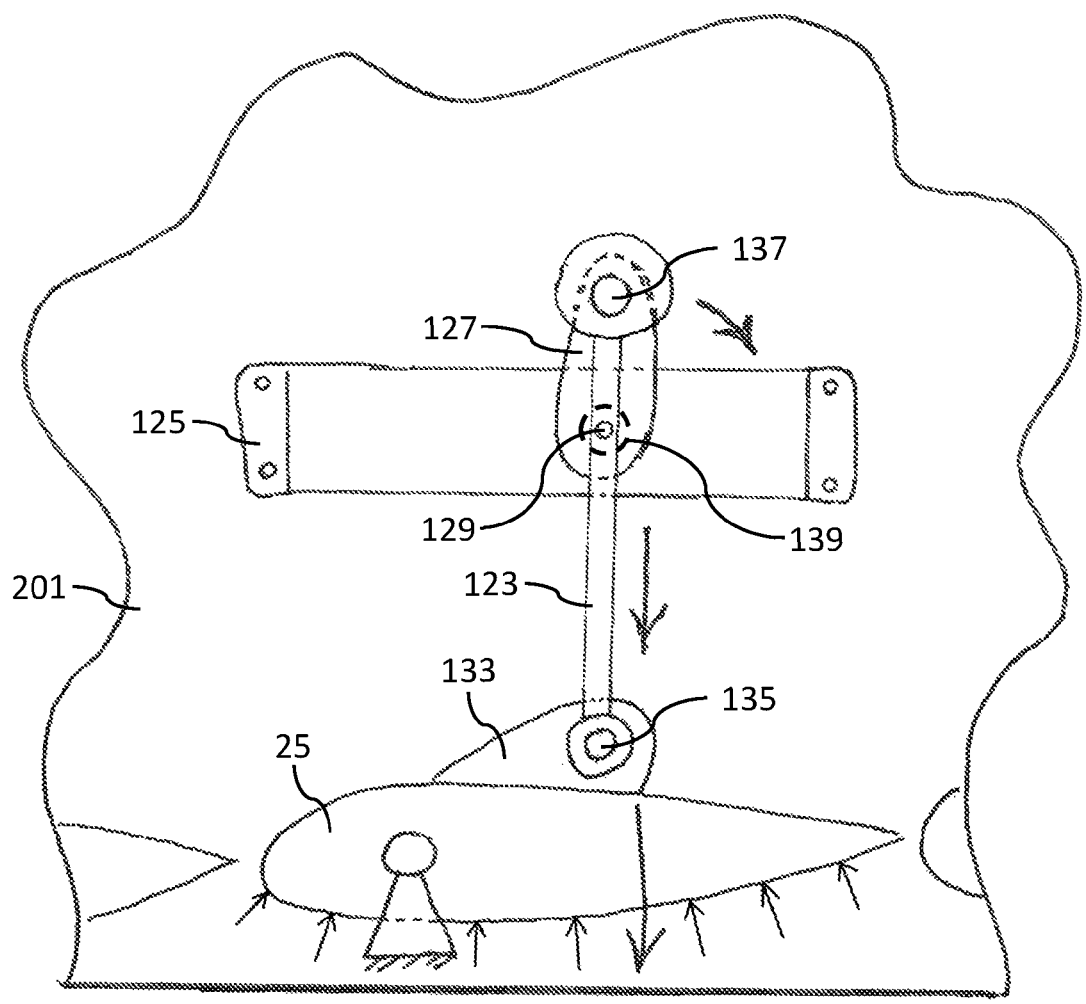
FIG. 29 is a side view of a stowed vane with on-center control linkage.

When the vanes of the preferred embodiment are stowed in a position that blocks the duct exit, constant and varying aerodynamic forces are imposed on them (FIG. 29). If conventional, reversing servos are used to actuate the vanes, power would be required to maintain position when under load. Energy would not only be wasted but servo would wear and their reliability reduced. To alleviate this issue, the preferred embodiment arranges the vane 25, vane bell crank arm 133, rotary actuator or servo 125 and servo bell crank arm 127, so that when the vane is in the stowed position, the joint centers 137 and 135 between the control rod 123 and servo bell crank arm 127 and vane bell crank arm 133 are aligned along the servo output shaft 139 axis of rotation 129. All servo and vanes in the preferred embodiment are arranged in a similar configuration to prevent aerodynamic or inertial forces from loading the servos when the vanes are stowed. Other embodiments may have differing geometric configurations of the servo or actuator connecting to the vane, but use the same principle of decoupling the rotation of the vane to servo when in the stowed position.

The preferred embodiment uses an internal combustion engine to power horizontal flight and to recharge the batteries of the electric propulsion systems. Take off, landing, and vertical flight is done using power from two electric motors and associated batteries and control units, and the internal combustion engine. This propulsion system 301 lends itself to redundancy if the power available from two of the three component systems is greater than the power needed to maintain altitude in vertical flight mode. Other possibilities include one or more engines of different type such as turboshafts or otherwise, either in concert with hybrid-electric systems or other propulsion types. Another embodiment may use one or more purely electric power plants using one or multiple electric motors or multiple electric windings within a single motor case. Multiple parallel powerplants not only work well for hybrid-electric propulsion systems but provide a means to implement redundant control systems.

The preferred embodiment uses a single rotor 401 consisting of primary components such as the hub 43, six blades 41, and spinner or hub cover 45. Additional embodiment of the present invention may use a different number of blades 41 and may or may not implement the use of a spinner 45 to direct air around the hub and provide impact protection to the rotor mechanism.

Figure 28:
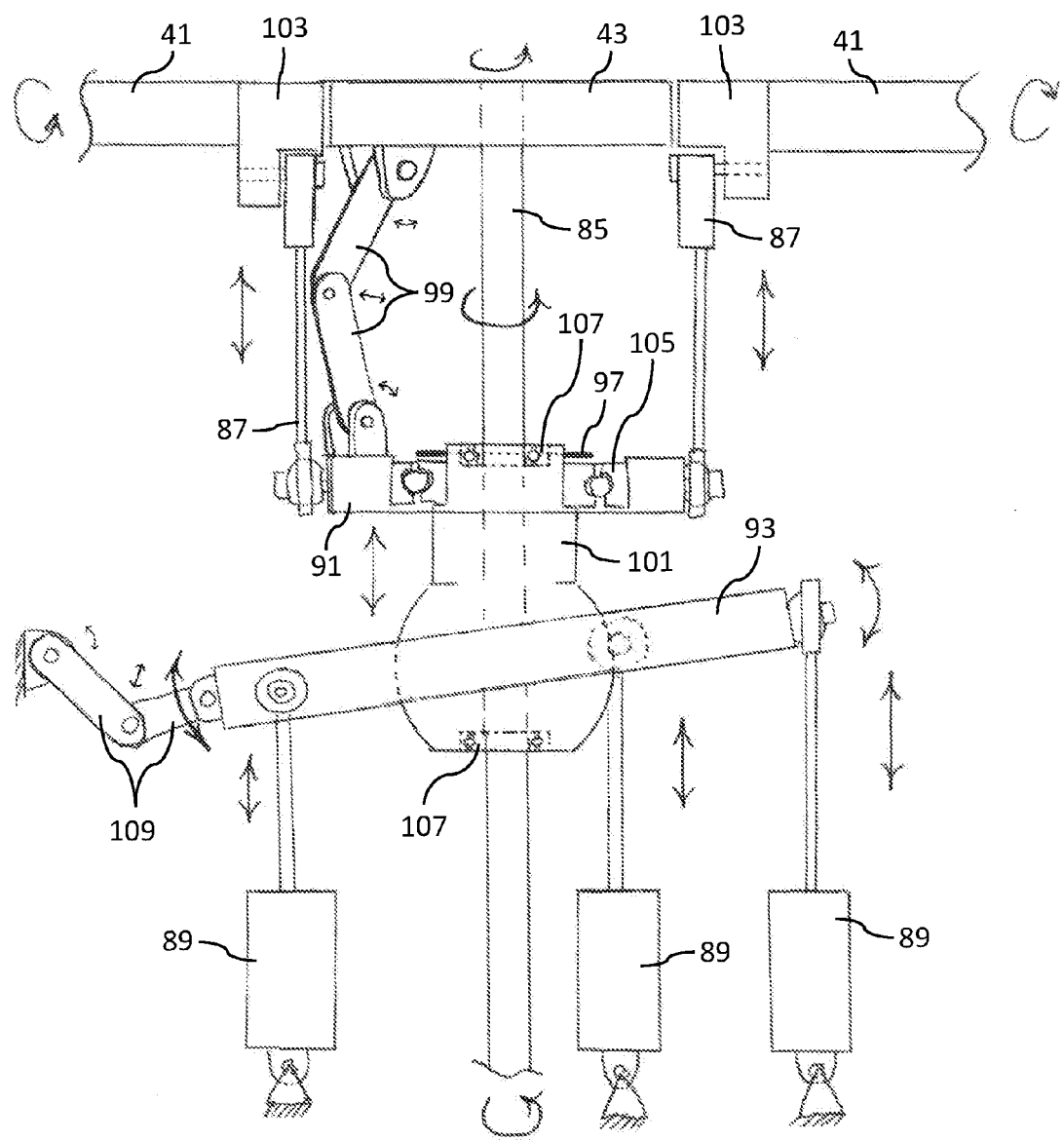
FIG. 28 is a side view of the voting rotor pitch control system—two-bladed rotor shown.

Pitch control of the preferred embodiment of the present invention uses a mechanical voting system that allows averaging from three irreversible servo 89 or actuator inputs to drive the rotor blade 41 pitch positions (FIG. 28). In the event one or more servos 89 or control systems stop functioning, the other servo or servos can drive the pitch system.

FIG. 28 depicts a side view of the present invention's rotor system, showing only two of the six blades and associated linkages for clarity. Rotor blades 41 and control arms 103 have pitch positions controlled by movement of three irreversible servos 89. The servos 89 are connected to a swivel plate 93 that pivots around a spherical bearing that is part of the slider 101. The three servo connections define a plane that determines the position of the slider 101 along the rotor shaft 85. The swivel plate 93 and the slider 101 do not rotate with the rotor shaft. Bearings 107 allow rotational isolation of the rotor shaft 85 and the slider 101 while still maintaining lateral continuity. The slider 101 is connected to a rotating collective fitting 91 through a rotational bearing 105 that is captured by a retaining clip 97 that resides in a machined groove. The rotational bearing 105 isolates the rotational movement of the collective fitting 91 to that of the slider 101 while still maintaining lateral and axial positioning. The collective fitting 91 translates along the rotor shaft and moves the each rotor link 87 the same axial distance the slider 101 moves. Each rotor link 87 is attached to a blade pitch arm 103, which is rigidly attached to a blade. The rotor pitch arms 103 convert linear motion of the links 87 to rotation of the blade 41 about the blade pitch axis. A set of links 99 is attached between the collective fitting 91 and the rotor hub 43. These maintain rotational position between the rotor head 43 and collective fitting 91 without impeding relative axial movement. Similarly, another set of links 109 attaches the swivel plate 93 to a rigid component on the airframe. These links 109 keep the swivel plate 93 from rotating with the rotor shaft 85 while still allowing the swivel plate to pivot freely about the its spherical bearing center. Another spherical bearing is required to attach the inner link 109 to the swivel plate 93 to allow independent rotation.

Other embodiments of the present invention may control the rotors pitch in a similar manner using different geometry and components but maintaining the ability to mechanically vote using a swivel plate 93 and multiple servos or actuators. The preferred embodiment uses three irreversible actuators to determine the swivel plate 93 orientation and position. Other embodiments of the present invention may use more than three reversible servos or actuators to vote and provide control redundancy to the rotor pitch system. A reversible servo or actuator is one that does not maintain position when power or commanded signal is lost. Still another embodiment of this invention is a system that contains multiple parallel pitch mechanisms that controls pairs of rotor blades attached opposite to each other on the rotor hub 43. Each system is driven by a servo 89, actuator or sets of either to independently control the pitch of pairs of rotor blades. For instants, a rotor hub containing six rotor blades could be controlled by three independent pitch mechanisms. Loads from the paired blades would be balanced across the rotor hub 43 even if they were commanded at different pitch angles from the other blade sets, or if they were inoperative.

The forgoing is considered as illustrative only to the principal of the invention. Further, since numerous changes and modification will occur to those skilled in the art, it is not desired to limit the invention to the exact construction and operation shown and described above, and accordingly, all suitable modifications and equivalents may be resorted to falling within the scope of the invention.

What is claimed is:
1. A vertical takeoff and landing vehicle, comprising:
 a. a rotor with a plurality of radial blades mounted to said vehicle with spin axis at oblique angle between said vehicle's longitudinal axis and vertical axis as means of accelerating air to provide lift and propulsion;
 b. a duct with an inlet facing forward to direct air into said rotor and direct air downward and aft;
 c. a plurality of vertical exit vanes near the bottom of said vehicle to control said vehicle;
 d. wherein each vertical exit vane of said plurality of vertical exit vanes has a rotational axis along its length about which it rotates independently to restrict and direct airflow;
 e. a plurality of aft exit vanes near the aft end of said vehicle to control said vehicle during, and transition to and from, horizontal flight mode;
 f. wherein said duct contains a left-hand vertical duct exit and a right-hand vertical duct exit, separated laterally and both extending longitudinally along the bottom of said vehicle;
 g. wherein said duct contains an aft duct exit that faces to the rear of said vehicle.
2. A vertical takeoff and landing vehicle of claim 1, further including a wing as primary means of providing lift when said vehicle is in horizontal flight mode.

* * * * *